US008996558B2

(12) United States Patent
Flanagan et al.

(10) Patent No.: US 8,996,558 B2
(45) Date of Patent: Mar. 31, 2015

(54) GEOLOCATION INFORMATION STORAGE SYSTEM FOR MOBILE COMMUNICATIONS DATA

(75) Inventors: Michael Joseph Flanagan, Chester, NJ (US); Peter Kenington, Chepstow (GB); Nicholas James Randell, Alton (GB)

(73) Assignee: JDS UK Limited, Basingstoke, Hampshire (GB)

( * ) Notice: Subject to any disclaimer, the term of this patent is extended or adjusted under 35 U.S.C. 154(b) by 190 days.

(21) Appl. No.: 13/293,536

(22) Filed: Nov. 10, 2011

(65) Prior Publication Data

US 2013/0122925 A1 May 16, 2013

(51) Int. Cl.
G06F 17/30 (2006.01)
H04W 24/08 (2009.01)

(52) U.S. Cl.
CPC ..................................... H04W 24/08 (2013.01)
USPC ......................................................... 707/765

(58) Field of Classification Search
None
See application file for complete search history.

(56) References Cited

U.S. PATENT DOCUMENTS

| | | | |
|---|---|---|---|
| 2004/0038687 A1 | 2/2004 | Nelson | |
| 2006/0002331 A1* | 1/2006 | Bhagwat et al. | 370/328 |
| 2006/0023642 A1* | 2/2006 | Roskowski et al. | 370/254 |
| 2007/0008884 A1* | 1/2007 | Tang | 370/230 |
| 2007/0087756 A1* | 4/2007 | Hoffberg | 455/450 |
| 2009/0075648 A1 | 3/2009 | Reed et al. | |
| 2009/0075655 A1 | 3/2009 | Dobson et al. | |
| 2011/0007076 A1* | 1/2011 | Nielsen et al. | 345/441 |
| 2011/0090080 A1* | 4/2011 | Yu | 340/539.13 |
| 2012/0072267 A1* | 3/2012 | Gutierrez et al. | 705/7.39 |

FOREIGN PATENT DOCUMENTS

| | | |
|---|---|---|
| EP | 1671506 | 11/2008 |
| GB | 2426155 A | 11/2006 |
| GB | 2452796 A | 3/2009 |
| JP | 2005094634 A | 4/2005 |
| WO | 2005029892 A1 | 3/2005 |
| WO | 2007022540 A2 | 2/2007 |
| WO | 2009034367 A1 | 3/2009 |
| WO | 2009034391 A1 | 3/2009 |

OTHER PUBLICATIONS

Great Britain Search Report, Application No. GB1119395.0, filed Mar. 12, 2012. (5 pages).

* cited by examiner

*Primary Examiner* — Wilson Lee
(74) *Attorney, Agent, or Firm* — JDS Uniphase Corporation

(57) ABSTRACT

A system (200) and method (500) are provided for storing communication session data and geolocation information derived from a wireless mobile communications system (210). A record of data for each communication session taking place in at least one geographical region of the mobile radio communications network (210) is stored (510) in a first storage area (220). Each record of data is accessed (520), and a subset of the data for each communication session is stored (530) in a second storage area (250). Geo-location information is derived (540) for each communication session, and stored in the second storage area (250) The method and system may allow much more rapid access to subsets of data, and if necessary to the original records.

22 Claims, 5 Drawing Sheets

| Type of information | Example/comment |
|---|---|
| Call connection setup information | This may include:<br>(i) The fact that a new voice or data call has been set up; and<br>(ii) The time at which it was set up. |
| Call closedown information | This may include:<br>(i) The fact that a voice or data call has been closed down;<br>(ii) The time at which this happened; and<br>(iii) The reason why the call closed down, i.e. was it closed down intentionally by the user, or prematurely due to a problem in/with the network. |
| Identification of radio links involved in call | This provides information about the base-stations to which the call is connected. |
| Measured radio propagation delay | This is the propagation delay measured for signals passing from the base-station to the handset, or vice versa. |
| The radio bearer or bearers involved during the call | The radio bearer(s) may be, for example, 3G, HSPA, HSPA+ etc. More than one may be involved, for example during a video-conferencing call. |
| The type of call | Examples of call types are: voice, data, SMS, MMS etc |
| Measurement reports | Measurement reports may provide information on:<br>(i) Cell sites that are visible to the user's terminal<br>(ii) Timing values. These may be offsets from the user-terminal's master clock at which the base-station's signals are seen. These may be used to determine the terminal's geographic location. |
| RCSP | The RCSP is effectively the received signal strength and signal-to-noise ratio, in the form of Ec/No. |
| Subscriber information | This may comprise the IMSI and IMEI. However, the user's identity is not known, since it is not known by the network. |

Fig. 4

GEOLOCATION INFORMATION STORAGE SYSTEM FOR MOBILE COMMUNICATIONS DATA

FIELD OF THE INVENTION

The field of the invention relates to the storage of geolocation information for communication data from a mobile radio communications network.

BACKGROUND OF THE INVENTION

Wireless communication systems, such as the $3^{rd}$ Generation (3G) of mobile telephone standards and technology, are well known. An example of such 3G standards and technology is the Universal Mobile Telecommunications System (UMTS™), developed by the $3^{rd}$ Generation Partnership Project (3GPP™) (www3gpp.org).

The $3^{rd}$ and $4^{th}$ generations of wireless communications, and systems such as LTE, have generally been developed to support macro-cell mobile phone communications. Here the 'phone' may be a smart phone, or another mobile or portable communication unit that is linked wirelessly to a network, through which calls are connected. Calls may be data, video, or voice calls, or a combination of these. Such macro cells utilise high power base stations to communicate with wireless communication units within a relatively large geographical coverage area. The coverage area may be several square kilometres, or larger if it is not in a built-up area.

Typically, mobile/portable wireless communication units, or User Equipment (UEs) as they are often referred to in 3G, communicate with a Core Network (CN) of the 3G wireless communication system. This communication is via a Radio Network Subsystem (RNS). A wireless communication system typically comprises a plurality of Radio Network Subsystems. Each Radio Network Subsystem comprises one or more cells, to which UEs may attach, and thereby connect to the network. A base station may serve a cell with multiple antennas, each of which serves one sector of the cell.

A parameter of interest to operators of mobile communication networks is 'quality of service information'. This is information that reveals how well the network is supporting users of the network. A high quality of service may be indicated by a very low rate of 'dropped' calls, or by very few mobiles experiencing low or highly variable signal strength.

In most known cellular networks, quality of service information is reported on a 'per-cell' or 'per-sector basis'. This means that the network statistics obtained will only provide an indication of, for example, the average data rate or the average number of dropped calls in a given sector. The 'per cell' or 'per sector' statistics are usually used since it is possible with prior art arrangements to develop meaningful statistics at the cell or sector level, without excessive data processing being required. These averages do not allow the network operator to narrow down the information, for example, to indicate if a particular portion of the sector is:
(i) Habitually causing calls to be dropped; or
(ii) Suffering from a poor data rate. A poor data rate may arise as a consequence of poor coverage in that particular area, or due to interference from a neighbouring cell.

A more detailed view of these issues is very useful to network operators. One prior art approach is thus to conduct 'drive tests', to assess coverage within a sector or cell. A test phone is driven in a vehicle through the cell, to derive individual measurements of e.g. signal strength, at exact locations. However, drive testing is expensive, and only provides data on what is happening at street level along the particular path taken during the test. The majority of phone and data calls are now made within buildings, and drive tests do not give any indication of the quality of service experience within a building. This is a major issue.

Geo-location is the identification of the real-world geographical location of, say, a UE of a 3G system or the like. Geo-location of UEs can be performed in several ways. These include providing a UE with positioning equipment, such as GPS, or using network and mobile measurement data for nearby cells.

However, even if a user's terminal device has a GPS receiver built in, these devices are frequently disabled by users to save battery life. They are not included at all on many devices, e.g. low-cost handsets, data 'dongles' for laptops, and machine-to-machine data communication terminals. The use of GPS data alone is therefore not sufficient to build an accurate picture of network service levels.

Some cellular systems are mandated to provide user location information when an emergency ('911') call is made. Again these calls are not sufficiently frequent to build up a good picture of the quality of service experienced throughout a network at all times of the day and night and in all seasons of the year. In addition, the network equipment architecture required in these 'E911 Geolocation' systems is complex, since every base-station in the network needs to be fitted with an additional piece of electronics in order to locate the user to a suitable (mandated) degree of accuracy, which is typically 100m. To use this type of architecture for service quality assessments throughout a network would be prohibitively expensive.

The network statistics referred to above, which only provide the average data rate or the average number of dropped calls in a given sector, are insufficient for some tasks faced by network operators. For example, if a particular mobile user complains that he is often subject to poor service, the data that is available may not help. Likewise, some individual faults in the network, such as wrongly directed antennas, may not be revealed by the 'average' data.

To try and improve the information available on service levels, some operators have attempted to compile more comprehensive data for a limited time on what exactly is happening in one sector or one cell of a network. There are two reasons why this is rarely done, as follows:
(i) A vast amount of data is created, even for a short time period such as a few hours. Storing this data in a retrievable form is very expensive.
(ii) If data concerning calls made in a sector or a cell of a network is captured for a period of a few hours, it then requires specialist post-processing. Any information that can be derived from the data about a user or part of the network is then often only available several hours after the end of the data capture. This may be several days after a user has made a complaint. Such information is only of limited value.

Prior art approaches often amount to a 'batch processing' technique. This approach gathers all of the information for a time period after a problem arose in a network sector. The data is essentially obtained manually, by the operator of the network. The operator makes a decision which cell to monitor, and for how long. The cell may be chosen, for example, because it is the cell in which a user who has made a complaint lives. The duration of the monitoring may depend on the amount of storage that the operator considers justified for the investigation. After capture of the data, it is then 'fed' to the processing system, which will then process the information off-line. This typically results in a delay of many hours, between the event of interest taking place and the resulting diagnostic information being available.

The fact that the process is 'retroactive' may also be a problem. The approach will only assist in identifying a fault:
(i) If it is a network fault that is still detectable, rather than one that only occurs intermittently. An intermittent fault could have many causes, such as one that occurs at particular times of day, or under certain external circumstances such as ambient temperature or vibrations of an antenna due to a particular wind direction.
(ii) If the user happens to be active during the few hours when the data is captured, for faults that are entirely due to the user's handset.

In summary, the prior art typically relies on average statistics for much quality of service analysis. Where data is captured, it is for a limited period of a few hours for a sector or cell where the operator judges that investigation may be warranted, despite the cost of carrying out that investigation. The captured data is often only of value if the fault happens to re-occur during the period of capture. Skilled analysis is required to process the captured data.

FIG. 1 provides a more detailed view of a prior art approach seeking to extract data concerning activity in the network, for a period of a few hours. The data may be obtained from a radio network controller RNC 112, 114 or 116 or similar network element, of a mobile radio communications network 110.

This data may then be processed to provide geographic location information, for the users in a cell or sector, or for a particular user who has reported a fault. The quality of service information may also be calculated for these users, or the particular user. Server 120 might be used to carry out this processing. The amounts of data involved in this process are extremely large.

Prior art systems that do attempt to record all data about what is happening in a sector or cell tend to place this data, in its entirety, on a single large storage device or on a number of large storage devices, associated with the final information database. Such a device is shown as storage device 140, linked to server 120 by a further database server 130. If information is available from a network planning system, it may too be supplied to server 140.

Users 150 are shown at the bottom edge of FIG. 1. The users 150 may access the communication session data from the large storage device 140, via an application server.

The processing in server 120 may be very basic. It may involve simply forwarding large volumes of data to storage device 140. The server may then calculate geolocation data once a user has started to enquire about a particular call, or a particular mobile communications unit in use in network 110. A result can then be returned to the user after:
(i) The original session data has been located within the large volume of data on storage device 140; and
(ii) A geolocation calculation is then performed on the original session data, once it has been found.

The delay for a user of the system may be considerable, and the cost of the equipment to provide even this level of service may be very great.

It might be assumed that it is possible to sort the acquired data and 'throw away' the information that is not required for display and reporting purposes. However, this has proved unacceptable in prior art systems, because the personnel in the network operations centre may wish to access a wide variety of measurements and parameters. They have a requirement to be able to diagnose problems with particular calls, or particular user devices. This may be necessary, to inform a particular user as to why they continually drop calls. It is hard, in advance, to know which information may not be needed for display. A clear answer has to be provided for particular users about whether, for example, the fault is due either to their own phone being faulty, or the network being at fault, such as due to poor coverage. It may also be necessary to diagnose a systemic fault with a particular brand or model of phone, or other user terminal device.

It has therefore proved necessary to retain all information about every call, in order to provide the desired level of detail to the operations centre staff, but nevertheless to provide near real-time quality of service data at the level of average statistics, for example for a whole cell. These average statistics fulfil the need of operations staff to be able to judge overall network quality, in all parts of their network, in addition to providing more precise data for a particular user or class of handset. It is this prior art approach that the present invention attempts to solve.

When seeking information about, for example, an individual handset or user, the prior art storage and retrieval mechanism centred on server 120 and storage device 140 has significant disadvantages. The main one is that the whole of the data must be searched and processed, in order just to extract the relatively small amounts of data which the network operations centre needs in order to make day-to-day judgements upon the quality of service offered by the network, for its users.

The 'raw' information which must be searched amounts to some ten times the amount of data which is typically required for display to the network operations managers. The processing of this unnecessarily large amount of data makes the reporting process very slow. In a typical prior art approach, the reporting process can take many hours. As a consequence, the information is therefore available to the network management centre some significant time after the user's phone-calls or data sessions to which that quality-of-service data refers. The information will sometimes be used for very practical changes. For example, there may be a need to arrange for alterations of antenna downtilt angles, or changes in cell-site transmit power levels, to reduce interference or increase coverage. The significant time delay in obtaining the information necessary to decide on these changes means, in real networks, that any required network changes occur much too late. Customers and/or calls are then lost.

BRIEF DESCRIPTION OF THE DRAWINGS

Embodiments of the invention will be described, by way of example only, with reference to the accompanying drawings, in which:

FIG. 4 is a schematic diagram, illustrating a record held in the first storage area of the invention.

DETAILED DESCRIPTION OF EMBODIMENTS OF THE INVENTION

The invention seeks to mitigate, alleviate or eliminate one or more of the disadvantages of the prior art, singly or in any combination. The invention uses two separate types of storage area for aspects of the user session data from a mobile radio communications network, as follows:

(i) A first type of storage area links directly to the processing units that extract information from the RNCs. This first type of storage area stores all of the data on each user session, extracted directly from the RNC. This data can be retained in the first storage area. By providing several, and possibly many, of these first storage areas, the access time to any individual one can be kept low. Thus the network management staff can access a particular record within one of the first storage areas within an acceptable time, on the rare occasions where direct access to an individual call record is needed.

(ii) The second type of storage area stores all of the relevant information on each user session, necessary for processing/display to the network operations staff for most requirements. The information contained in this second storage area may be one tenth of the volume of that in the first storage areas. An enquiry from network operations staff will normally be satisfied by the reduced set of data in the second type of storage area, which can be accessed in real time. This helps to reduce the number of occasions when further enquiries must be made in the first type of storage area.

Compared to the delays of several hours that are typical of prior art approaches to the problem of recording and retrieving call session data, the invention may offer near real-time access. Data may be processed and available in the first and second storage area within minutes of a set of data being made available from the network, which may for example occur every fifteen minutes. Once in the second storage area, the data may be accessed in seconds or less. Data that is retained in the first multiple storage areas may also, for example, be accessible within 30 seconds or less.

Figure 2:
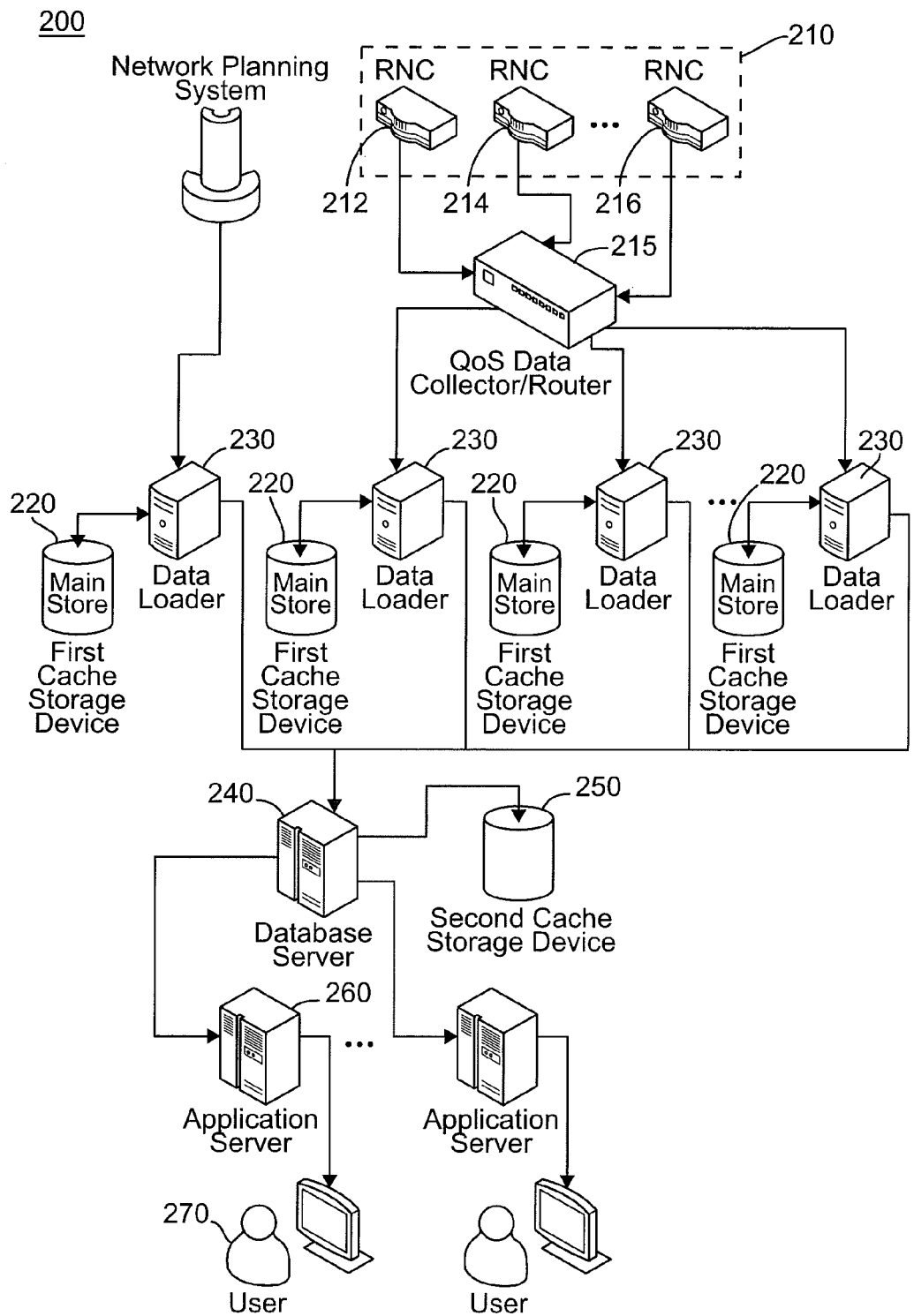
FIG. 2 is a schematic diagram, illustrating an embodiment of the invention.

Examples of the invention will be described in terms of a method and system for geolocation data storage. FIG. 2 illustrates a geolocation data storage system 200 in accordance with an embodiment of the invention.

Geolocation data storage system 200 is operable to store communication session data from a mobile radio communications network 210. Mobile radio communications network 210 may, for example, be a 3GPP network, supporting mobile communication units. Mobile radio communications network 210 does not itself form part of the geolocation data storage system 200.

The geolocation data storage system comprises two types of storage area. A first storage area 220 stores a record of data for each communication session taking place in at least one geographical region of the mobile radio communications network 210. The record of data is provided to first storage area 220, via a first processing module. First processing module may, for example, reside within data loader 220. The first storage area 220 shown in FIG. 1 acts as a main store for data from data loader 230. However, data loader 230 may have its own internal storage, for use whilst processing data.

The first processing module also processes the record of data for a communication session, to identify a 'subset' of the data for the communication session. From the first processing module 230, the subset passes to a second storage area 250. The second storage area 250 stores the subset of the data for the communication session, rather than the whole record that is available in first storage area 220.

One function of the first processing module is to derive geo-location information from the records of data. The geo-location information may indicate where an individual subscriber was located, when it took part in a communication session. The geolocation information for the communication session is then passed to, and stored in, the second storage area 250. Preferably, the geolocation information is stored together with the subset of data to which it relates. However, there could instead be a separate part of second storage area 250 that holds all the geolocation information together.

The geolocation data storage system 200 of the invention therefore provides a second storage area with:
(i) A subset of the data that is held in each original record that is in the first storage area 220; and
(ii) Geolocation information for each subset of data.

The first processing module may be further operable to derive quality of service information for the communication session. This quality of service information may then be stored in the second storage area 250.

Typically, second storage area 250 comprises a cache memory. A database server 240 may provide an interface between the first processing module and the second storage area 250.

The mean storage volume required in first storage area 250 for at least a first record of data on a first communication session and a second record of data on a second communication session, may be approximately ten times as much as the mean storage volume that is required for the corresponding first and second subsets of data, geolocation information and quality of service information, in second storage area 220.

The exact storage space required for each record of data in first storage area 250 and the corresponding information in second storage area 250 will depend on the nature of the records obtainable from a particular mobile radio communications network 210, and the parts of each record passed on as the subset and stored in second storage area 250. However, the mean storage space occupied in the second storage area 250 for each subset of data, geolocation information and quality of service information, will be less than 20% of the mean storage space occupied for the corresponding record of data in the first storage area 220.

Quality of Service (QoS) data collector or router 215 may pass communication session data from the mobile radio communications network 210 to the geolocation data storage system 200. The communication session data may itself pass from Radio Network Controllers such as 212, 214 and 216 to the QoS data collector/router 215. However, the data may partially or wholly originate in the Operation Support Service of the mobile radio communications network 210.

FIG. 2 also shows an application server 260, a user 270 and network planning system 290. Details of these remaining elements are provided following a discussion, below, of the data and information held in second storage area 250 and the records held in first storage area 220.

Figure 3:
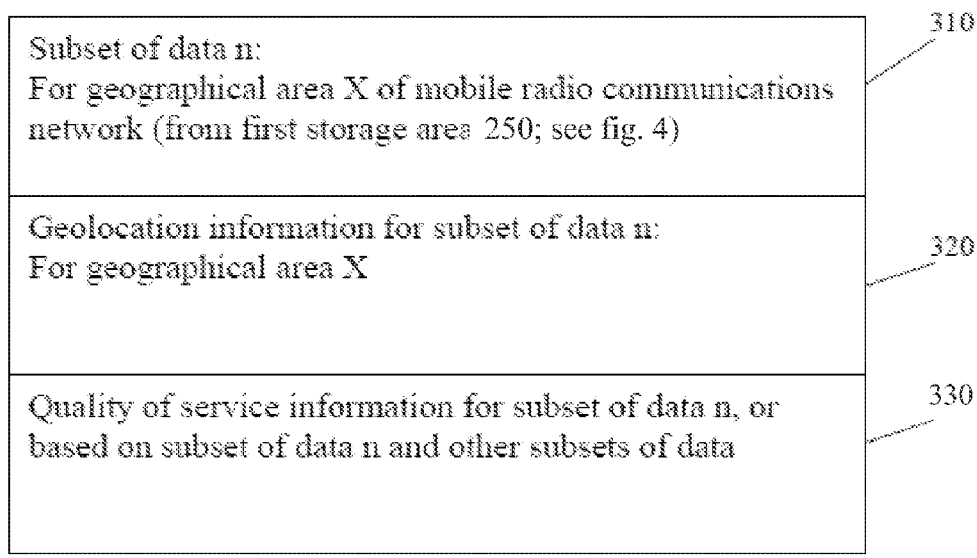
FIG. 3 is a schematic diagram, illustrating information held in the second storage area of the invention.

FIG. 3 illustrates an example of the information 300 that may be stored in second storage area 250. The upper part of FIG. 3 shows a subset of data n 310, derived by the first processing module, which may reside in data loader 240. FIG. 3 uses the example of a subset of data n, from a particular geographical area X of the mobile radio communications network 210. Many other similar subsets of data such as subset n from geographical area X will be stored in second storage 250. There may, for example, be millions of subsets of data n added to second storage area 250 per day. The subsets of data may relate to purely voice calls, purely data calls, or calls involving multiple types of bearer, e.g. voice, and data simultaneously.

The middle part of FIG. 3 shows the geolocation information 320 for the subset of data n from a particular geographical area X. The geolocation information will typically be at a finer resolution than just an identification of the cell or sector in which the call took place. A variety of algorithms may be used to calculate the geolocation information, and these provide varying precision and accuracy.

The lower part of FIG. 3 shows quality of service information 330 relevant to the subset of data n from a particular geographical area X. This quality of service information may not be unique to subset of data n. It may, for example, have been calculated from a large number of records such as n, and thus may be stored once only in second storage area 250, remotely from subset of data n.

FIG. 4 shows one detailed example of the kind of data that may be included in a record held in first storage area 220, from which subset of data n in FIG. 3 is derived. The mobile radio communications network 210 may generate a vast amount of data, if it is sufficiently large to handle millions or tens of millions of calls per day, each leading to a data record as shown in FIG. 4.

When the invention is applied to different types of mobile radio communications networks, such as 3G, 4G, LTE, the resulting data records may vary from the exact listing shown in FIG. 4. However, session data corresponding to the entries shown in FIG. 4 as 'Call connection setup information', 'Call closedown information', 'The type of call', will be generated in each of these networks. The exact details shown in the right column of FIG. 4 may well vary between networks, but the majority will be available from all networks.

The entire record 300 shown in FIG. 3 may typically occupy only 10% of the storage volume required for the corresponding original record shown in FIG. 4. The 90% space saving provided by the operation and configuration of second storage area 250 may thus offer several advantages, as follows:
(i) Access to the subset n 310, corresponding geolocation information 320, and quality of service information 330 may be far more rapid than could be achieved with the configuration of prior art systems.
(ii) If the volume of records in the first storage areas 220 requires that they be deleted in a matter of days, then this may not apply to second storage area 250. Subsets of data n 310 may be kept for longer than records of data in the first storage area 250, before the amount of information in second storage area 250 requires deletion of older or less frequently accessed subsets of data.

As shown in FIG. 4, the record of data stored in the first storage area 220 for a communication session may comprise substantially all of the data for the communication session available from a radio network controller 212. However, this data may instead be obtained from an operational support system (OSS) of the mobile radio communications network 210, for the at least one geographical region.

Returning to FIG. 2, second storage area 250 is typically a database. As explained above in connection with FIGS. 2-4, second storage area 250 contains the geolocation information associated with each call. The subsets of data in second storage area 250 may each be stored at the same location as the geolocation position 'fix'. The associated quality of service data may also be co-located with the subset of data and gelocation 'fix'. The first storage area 220 does not contain this geolocation 'fix', as it has not been calculated at the point when the corresponding record was created in first storage area 220, which may also be a database. First storage area is acting as a reservoir of all of the potentially useful information from the relevant RNC(s). However, in most situations, only a very small percentage of the records in the first storage area, possibly one in a million, will ever have to be retrieved for more detailed investigation.

The geolocation data storage system 200 may include a data loader 230, the data loader acting as the first processing module 230. The data loader of FIG. 2 is connected either to one or more radio network controllers 212, or the operational support system of the wireless communications network 210, and receives all of the available communication session data for a radio network controller 212. The first storage means 220 then:
(i) Stores the record of data for each particular communication session within a collection of records of communication session data. This storage hierarchy enables more orderly, and hence more rapid, access to the record if this is ever required.
(ii) Allows access to the record of data for the communication session in response to an index that specifies both an identity of the collection of records of communication session data, and an individual identity of the particular communication session.

If a single second storage area 250 holds subsets of data n from multiple first storage areas 220, as shown in FIG. 2, then the process for later accessing an individual record in one of the first storage areas 220 that corresponds to a given subset of data n may involve:
(i) Identifying which first storage area 220 the record is in;
(ii) Identifying which collection of records within the identified first storage area 220 is the right collection; and
(iii) Finding the correct record for the particular individual communication session of interest, within the identified collection of records.

The subset of data 310 n for the communication session in the second storage area 250 may include an index for retrieving the corresponding record of data for the communication session from the first storage area 220, the index comprising:
(i) a first identifier, the first identifier indicating the location in the first storage area 220 of the collection of records of session data that includes the relevant record of data;
(ii) a second identifier, the second identifier indicating the location of the relevant record of data for the communication session, within the indicated collection of records.

As shown in FIG. 2, the geolocation data storage system 200 may include an application server 260. Application server 260 may enable remote access to data held in various parts of geolocation data storage system 200, and may be a web server.

The application server 260 is connected to the second storage area 250 via the database server 240. Database server 240 is operable to access the subset of data 310 n, the corresponding geolocation information 320 and the relevant Quality of Service information 330 for the same communication session, from the second storage area 250.

Application server 260 is further connected to one of the first storage areas 220 via the database server 240. Thus application server 260 may retrieve part or all of the record of data for any communication session from the first storage area 220. This retrieval may take place in typically 30 seconds or less, in response to a specific enquiry from the application server 260.

The arrangement of application server 260 and the first 220 and second 250 storage areas provides a fault diagnosis system for the mobile radio communications network 210. The application server 260 can support a user interface. The user interface then allows a user 270 of the fault diagnosis system to, for example:
(i) Access the subset of data 310 n, and the corresponding geolocation information 320, from the second storage area 250; and
(ii) Retrieve data from the record of data for the corresponding communication session from the first storage area 220.

When seeking information about a fault somewhere in the network, a user 270 might typically make an enquiry about either a particular communication session, or a particular mobile communication unit. Application server 260 would then allows the user to:
(i) Access the subset of the data 310n, the geo-location information 320 and the record of data for the communication session; and
(ii) Derive information about the communication session and/or the mobile communication unit.

Figure 1:
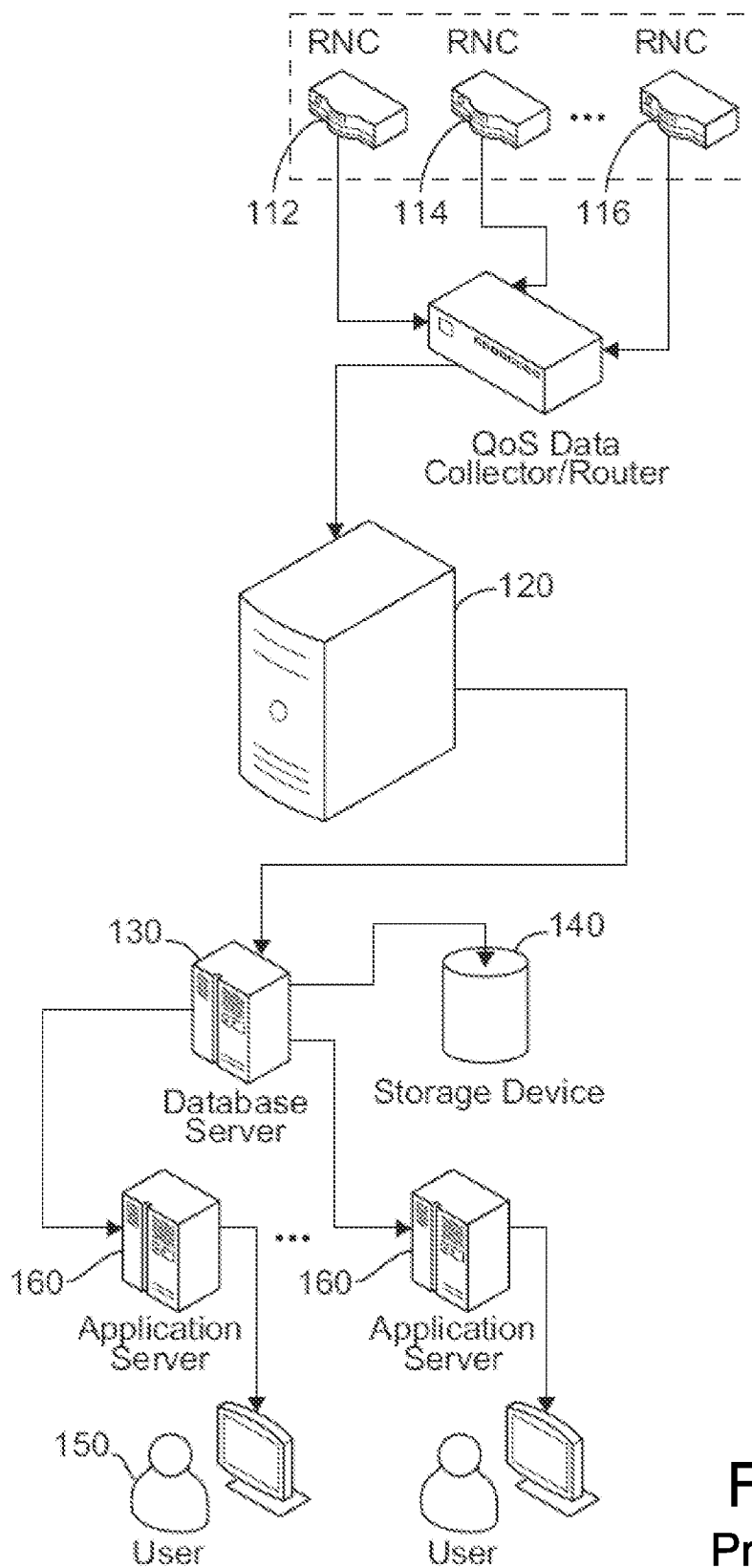
FIG. 1 is a schematic diagram, illustrating an apparatus in accordance with the prior art.

With prior art approaches such as shown in FIG. 1, when answering an enquiry from a user of the storage system of FIG. 1, an entire RNC-derived database would need to be searched, and then a geolocation calculation performed, prior to display of data in a network operations centre. This is not the case for the invention of FIGS. 2-4. The invention provides very significantly faster access than with prior art systems.

The invention may provide information to the network operations centre between a few minutes and around an hour (maximum) from the time the relevant call was placed. Fifteen minutes of this delay, in the worst-case scenario, is inherent in the reporting mechanism of the RNC 212. This is because batches of call session data may only become available from the RNC 212 to data loader 230 periodically, for example every 15 minutes. The processing to derive the information 300 shown in FIG. 3 may add only a few minutes to this time, and may be practically instantaneous. Prior art systems would not have been able to provide comparable information for many hours.

As shown in FIG. 2, network planning system 290 may provide information to a data loader 230, containing a first processor. Network planning system 290 may contain information such as:
(i) The location of antennas that serve cells or base stations of wireless communications network 210; and
(ii) The pointing angle of the antennas.

Where information from network planning system 290 is available, a user 270 may also access this information via application sever 260, database server 240 and the relevant first storage area 220. A user 270 may more rapidly diagnose faults in the network when the user can view both information from network planning system 290, and fault information derived from one or more subsets of information from second storage 250.

As was explained in connection with FIG. 2, the invention comprises a method of storing communication session data from a mobile radio communications network 210, the mobile radio communications network supporting mobile communication units.

Figure 5:
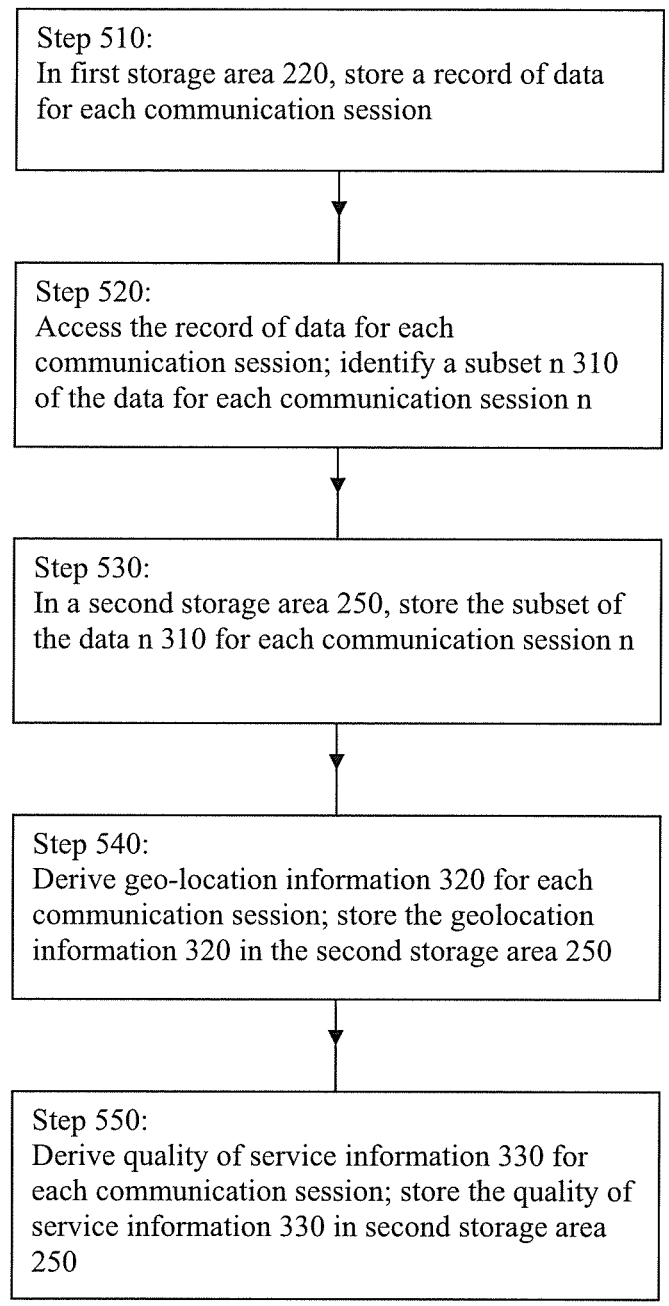
FIG. 5 illustrates a simplified flowchart of an example of a method in accordance with an embodiment of the invention.

FIG. 5 shows the method 500 of the invention, in a flowchart. The steps of the method comprise:
(i) Storing 510, in a first storage area 220, a record of data for each communication session taking place in at least one geographical region of the mobile radio communications network 210.
(ii) Accessing 520, the record of data for each communication session, and processing the record of data for each communication session to identify a subset of the data n for each communication session.
(iii) Storing 530, in a second storage area 250, the subset of the data n for each communication session.
(iv) Deriving 540 geo-location information for each communication session, and storing the geolocation information in the second storage area 250.

As shown in the flowchart of FIG. 5, the method 500 may comprise deriving 550 quality of service information for each communication session, and storing the quality of service information in the second storage area 250.

It is important to note that the steps of FIG. 5 illustrate just one embodiment of the invention. In an alternative embodiment, the identification of the subset n 310 of data that is shown in step 520 may occur before the storage of the record shown in step 510. In another alternative embodiment, the step of deriving the geolocation information 320, which is shown in step 540, may occur before the storing of the subset of data that is shown in step 530. Likewise, the quality of service information 330 may be derived prior to storage of the subset of data.

The method of the invention may also comprise, in response to an enquiry about a communication session or a mobile communication unit, supplying one or more subsets of data for communication session(s) and the geo-location information for either the communication session(s) or the relevant mobile communication unit, from the second storage area 250 to the application server 260, via the database server 240.

A subset of data 310 n for a communication session in the second storage area 250 may comprise an index for retrieving the corresponding record of data for the communication session, from the first storage area 220. The index provides:
(i) a first identifier, the first identifier indicating the location in the first storage area 220 of the relevant collection of records of data;
(ii) a second identifier, the second identifier indicating a location of the corresponding record of data, within the collection of records of data.

The record of data stored in the first storage area 220 for each communication session may comprise substantially all of the data for each communication session that is available from a radio network controller 212 or the Operational Support System (OSS) of the mobile radio communications network, for the at least one geographical region.

The method of the invention may further comprise accessing the communication session data from the data loader 230 of the mobile radio communications network 210, prior to storing communication session data in the first storage area 250. The method may further comprise:
(i) The first processing module 230 processing the record of data for each communication session, to identify the subset n 310 of the data for each communication session; and
(ii) In response to a specific enquiry from the application server 260, accessing the subset of data n 310 and the geolocation data 320 for the communication session from the second storage area 250, via the database server 240.

In response to the specific enquiry from the application server 260, the method may also comprise retrieving data from the record of data for the communication session from the first storage area 220, within 30 seconds.

The method of storing communication session data in accordance with the invention may comprise storing substantially all of the data for the communication session available from a radio network controller 212 or the Operational Support System of the mobile radio communications network, for the at least one geographical region, in the record of data in the first storage area 220. See again FIG. 4.

In an embodiment where the communication session data shown in FIG. 4 is stored in a record of data in the first storage area 220, then the corresponding subset of data stored in second storage area 250 may comprise the following:
(i) call connection setup information and call closedown information;
(ii) information concerning the radio links and/or the radio bearers involved in the call;
(iii) the type of call;

(iv) timing data concerning the cell sites visible to a user terminal;
(v) received signal strength and/or signal-to-noise ratio for the call.

However, various elements of the record of data in first storage area 220 may be extracted, and stored as the subset of data in second storage area 250. The exact subset of data will depend on the type of communication system, and on the nature of enquiries anticipated from users of the system.

The method of storing communication session data in accordance with the invention may further comprise:
(i) Deleting a record of data for a communication session from the first storage area 220, after a pre-set time limit; and
(ii) Retaining the corresponding subset of data in the second storage area beyond the time limit.

So a record may be deleted from first storage area 220, for example, one week after it is created. However, the subset of data n 310, geolocation information 320 and quality of service information 330 derived from that record may be held for longer than a week. For example, this information may be retained for a month, or may only be deleted when second storage area 250 is reaching capacity.

The method of the invention allows near real-time accessing of data obtained from a mobile radio communications network. Key to this are the steps of storing subsets n 310 of communication session data and geolocation information 320 as outlined above. The method allows remote accessing of the geolocation information and the subset(s) of communication session data from the second storage area 250, via an application server. Besides accessing subsets of data, records of data for a mobile communication unit of the mobile radio communications network may also be accessed. The access may also just be for a particular communication session, rather than a mobile communication unit.

A tangible computer program product may be provided, having stored executable program code for programming signal processing logic to perform a method in accordance with the invention. The tangible computer program product may comprise at least one of: a hard disk, a CD-ROM, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM), and a Flash memory.

ADVANTAGES OF THE INVENTION

Embodiments of the invention described above may provide some or all of the following numbered advantages. The numerical examples cited below are to illustrate the invention, and to aid understanding. They are not limiting. Wide variations of many of these parameters will still fall within the terms of the invention.

1. The invention may provide greater processing speed for the information most commonly sought by network operations staff.
2. There may be a relatively small database storage requirement for second storage area 250, compared to prior art systems. The second storage area acts as a cache, which needs to operate quickly to provide a rapid service to the users 270. It may therefore use high-performance disks, which are expensive. The first storage area 220 also acts as a cache.

The invention allows the first cache to use slower and cheaper disks than would otherwise be the case. These may be of only slightly greater price/performance than typical consumer hardware. This cost advantage may be significant, since the disks for the first storage area 220 may need to be very large. They may typically be ten times the size of those used for second storage area 250.

3. There may be a very fast loading performance for the second storage area 250, with less data to load than would be the case with prior art arrangements. Hence user results are available sooner.
4. The coding to implement the invention may be simpler. This is because there may only be a need for a parser for the original data in the first processor, rather than a need for a parser that can handle the original data and a converter to convert it into an internal format. Since the original data is stored in each first storage area 220 in its original format, the same parser can be used to extract the reduced amount of information passed to the second storage area 250. The parser can also subsequently be used to query in detail the data records in the first storage area 220, when a detailed query is requested by a user.
5. The invention may aid the presentation of information in a standard way, which users 270 understand. Storing the information in a standard (raw RNC) format in the first storage area 220 offers the possibility of using other, third-party tools to analyse the information, if users wish.
6. The invention may cope easily with additional record types. This may be useful if the RNC 212 provides additional messages in the future, especially if the messages are in standard 3GPP format. This is, in effect, a future-proofing feature for the system.
7. The overall storage costs for the invention may be lower than for prior art approaches, in addition to providing faster access.
8. Remote access may allow access to the first storage area 220 and second storage area 250 to be shared by as many users, in as many locations, as desired.
9. It is possible that as few as 1 call in 100 million calls would ever be queried as far back as the individual record in first storage area 220. Users 270 are typically most interested in failures, and not successful calls.

It will be appreciated by a skilled artisan that the inventive concept herein described may equally be implemented within cellular communication networks adapted in accordance with alternative wireless communication technologies and standards. The invention is not restricted to the Universal Mobile Telecommunications System (UMTS™) cellular wireless communication network mentioned in the exemplary embodiments above.

Furthermore, the inventive concept can be applied to any signal processing circuit. It is further envisaged that, for example, a semiconductor manufacturer may employ the inventive concept in a design of a stand-alone device, such as a microcontroller, digital signal processor, or application-specific integrated circuit (ASIC) and/or any other sub-system element.

It will be appreciated that, for clarity purposes, the above description has described embodiments of the invention with reference to different functional units and processors. However, it will be apparent that any suitable distribution of functionality between different functional units or processors, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components such as field programmable gate array (FPGA) devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

The invention claimed is:

1. A geolocation data storage system for communication session data from a mobile radio communications network, the mobile radio communications network supporting mobile communication units, the geolocation data storage system comprising:
   a first storage area, the first storage area operable to store a record of data for each communication session taking place in at least one geographical region of the mobile radio communications network;
   a first processor, the first processor operable to access the stored record of data for each communication session, to identify a subset of the data for each communication session, and to calculate geolocation information for each communication session; and
   a second storage area, the second storage area operable to store the subset of the data for each communication session, and the geolocation information for each communication session;
   wherein the geolocation data storage system is configured to delete the record of data for the communication session from the first storage area after a pre-set time limit, and retain the subset of data in the second storage area beyond the time limit.

2. A geolocation data storage system according to claim 1, wherein:
   (i) the first processor, is further operable to derive quality of service information for each communication session, and
   (ii) the second storage area is further operable to store the quality of service information in the second storage area.

3. A geolocation data storage system according to claim 2, wherein, when the first storage area stores at least a first record of data on a first communication session and a second record of data on a second communication session, and the second storage area stores corresponding first and second subsets of data, geolocation information and quality of service information:
   the mean storage space occupied in the second storage area for each subset of data, geolocation information and quality of service information, is less than 20% of the mean storage space occupied for the corresponding record of data in the first storage area.

4. A geolocation data storage system according to claim 1, wherein:
   a record of data stored in the first storage area for a communication session comprises substantially all of the data for the communication session available from a radio network controller or an operational support system of the mobile radio communications network, for the at least one geographical region.

5. A geolocation data storage system according to claim 4, further comprising:
   a) a data loader, the data loader comprising the first processor, and the data loader being:
      (i) connected to the radio network controller or the operational support system; and
      (ii) operable to receive all of the available communication session data;
   b) the first storage means being operable to:
      (i) store a record of data for any particular communication session within a collection of records of communication session data; and
      (ii) allow access to the record of data for the communication session in response to an index that specifies both an identity of the collection of records of communication session data, and an individual identity of the record of data for the communication session.

6. A geolocation data storage system according to claim 1, wherein the subset of data for each communication session in the second storage area includes an index for retrieving the record of data for the communication session from the first storage area, the index comprising:
   (i) a first identifier, the first identifier indicating the location in the first storage area of a collection of records of session data, the collection of records of session data including the record of data for the communication session; and
   (ii) a second identifier, the second identifier indicating a location of the record of data for the communication session, within the collection of records.

7. A geolocation data storage system according to claim 1, further comprising an application server and a database server, the application server:
   (i) connected to the second storage area via a database server; and
   (ii) operable to access the subset of data and the geolocation information for each communication session from the second storage area.

8. A geolocation data storage system according to claim 7, wherein the application server is:
   (i) connected to the first storage area via the database server and a data loader; and (ii) operable, in response to a specific enquiry from the application server, to retrieve data from the records of data for the communication sessions from the first storage area within 30 seconds.

9. A fault diagnosis system for a mobile radio communications network, the mobile radio communications network supporting mobile communication units, the fault diagnosis system comprising a geolocation data storage system in accordance with claim 7,
   wherein the application server comprises a user interface operable to:
   (i) allow access to the subset of data and the corresponding geolocation information from the second storage area; and
   (ii) retrieve data from the records of data for the communication sessions from the first storage area; and
   wherein the application server is operable, in response to an enquiry about a communication session or a mobile communication unit, to:
   (i) access the subset of data, the geolocation information and the records of data for the communication sessions; and
   (ii) derive information about the communication sessions and/or the mobile communication units.

10. A method of storing communication session data from a mobile radio communications network, the mobile radio communications network supporting mobile communication units, the method comprising:
    storing, in a first storage area, a record of data for each communication session taking place in at least one geographical region of the mobile radio communications network;
    accessing the record of data for each communication session, and processing the record of data for each communication session to identify a subset of the data for each communication session;
    storing, in a second storage area, the subset of the data for each communication session;
    calculate geolocation information for each communication session, and storing the geolocation information in the second storage area; and
    deleting a record of data for a communication session from the first storage area after a pre-set time limit and retaining the corresponding subset of data in the second storage area beyond the time limit.

11. A method of storing communication session data according to claim 10, further comprising deriving quality of service information for each communication session, and storing the quality of service information in the second storage area.

12. A method of storing communication session data according to claim 10, further comprising, in response to an enquiry about a communication session or a mobile communication unit in use with the radio communications network:
    supplying one or more subsets of data for communication session(s) and the geolocation information, for the communication session(s) or the mobile communication unit, from the second storage area to an application server via a database server.

13. A method of storing communication session data according to claim 10, further comprising a subset of data for a communication session in the second storage area comprising an index for retrieving the corresponding record of data for the communication session from the first storage area, the index providing:
    (i) a first identifier, the first identifier indicating the location in the first storage area of a collection of records of data; and
    (ii) a second identifier, the second identifier indicating a location of the corresponding record of data, within the collection of records of data.

14. A method of storing communication session data according to claim 10, wherein:
    the record of data stored in the first storage area for each communication session comprises substantially all of the data for each communication session that is available from a radio network controller or an OSS of the mobile radio communications network, for the at least one geographical region.

15. A method of storing communication session data according to claim 14, wherein
    the storing of communication session data in the first storage area is preceded by accessing the communication session data from a data loader, the data loader being connected to the radio communications network; and
    the data loader processes the record of data for each communication session, to identify the subset of the data and the geolocation information for each communication session.

16. A method of storing communication session data according to claim 15, further comprising:
    in response to a specific enquiry from an application server, accessing the subset of data and the geolocation information for the communication session from the second storage area, via a database server.

17. A method of storing communication session data according to claim 16, further comprising:
    in response to the specific enquiry from the application server, also retrieving data from the record of data for the communication session from the first storage area; and
    wherein the application server is connected to the first storage area via the database server and the dataloader.

18. A method of storing communication session data according to claim 10, further comprising:
    the mean storage space occupied in the second storage area for each subset of data, geolocation information and quality of service information, being less than 20% of the mean storage space occupied for the corresponding record of data in the first storage area.

19. A method of storing communication session data according to claim 10, further comprising:
    storing substantially all of the data for the communication session available from a radio network controller or an operation support system of the mobile radio communications network, for the at least one geographical region, in the record of data in the first storage area.

20. A method of storing communication session data according to claim 10, further comprising:
    remotely accessing the geolocation information and the subset(s) of communication session data from the second storage area, via an application server for a mobile communication unit of the mobile radio communications network and/or for a communication session.

21. A method of storing communication session data according to claim 10, further comprising the step of:
    utilizing a tangible computer program product having executable program code stored therein for programming signal processing logic.

22. A method of storing communication session data according to claim 21, wherein the tangible computer program product comprises at least one of: a hard disk, a CD-ROM, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM), and a Flash memory.

* * * * *